United States Patent Office 3,485,787
Patented Dec. 23, 1969

3,485,787
HYDROGENATED BLOCK COPOLYMER
COMPOSITIONS WITH OIL
Walter R. Haefele, Orinda, and Charles A. Dallas, Lafayette, Calif., and Marvin A. Deisz, deceased, late of Akron, Ohio, by Joseph P. Sansonetti, executor, Akron, Ohio, assignors to Shell Oil Company, New York, N.Y., a corporation of Delaware
No Drawing. Continuation-in-part of application Ser. No. 275,688, Apr. 25, 1963. This application Dec. 27, 1966, Ser. No. 605,073
The portion of the term of the patent subsequent to July 25, 1984, has been disclaimed
Int. Cl. C08f 45/28
U.S. Cl. 260—33.6                                            4 Claims

ABSTRACT OF THE DISCLOSURE

Elastomeric compositions are prepared by extending with mineral oil hydrogenated block copolymers having the general configuration A–B–A wherein prior to hydrogenation each A is a monovinylarene polymer block and B is a conjugated diene polymer block.

---

This application is a continuation-in-part of patent application Ser. No. 275,688, filed Apr. 25, 1963, now U.S. 3,333,024.

This invention is concerned with novel compositions comprising certain hydrogenated block copolymers modified with mineral oils. More particularly, the invention is directed to compositions comprising hydrogenated block copolymers of monovinylarenes and conjugated dienes modified with mineral oils.

The parent application, of which this application is a continuation-in-part, claims as new compounds the hydrogenated block copolymers having the general structure

A–B–A wherein, prior to hydrogenation, each A is a polymerized alkenyl aromatic hydrocarbon block having an average molecular weight of between about 4,000 and 115,000; B is a polymerized conjugated diene hydrocarbon block having an average molecular weight of between 20,000 and 450,000; the blocks A constituting 2–33% by weight of the copolymer; the unsaturation of the polymer having been reduced by hydrogenation to a value within the range of 0–30% of the original unsaturation. A typical polymer of this type has the general structure prior to hydrogenation of polystyrene-polyisoprene-polystyrene. Subsequent to virtually complete hydrogenation this same polymer would have the general structure polyvinylcyclohexane - ethylene-propylenecopolymer-polyvinylcyclohexane. These hydrogenated polymers have been found to have especially valuable physical properties and are substantially more stable than their corresponding unsaturated precursors.

One of the problems associated with block copolymers of this type particularly when elastomeric compositions are desired is to find a means of extending the block copolymer so as to reduce its original cost and, secondly, to convert some of the types of such copolymers from their thermoplastic behavior into compositions having elastomeric properties.

It is an object of the present invention to provide improved polymeric compositions. It is a further object of the invention to provide extended block copolymers compositions having outstanding stability. It is a particular object of the invention to provide compositions wherein originally thermoplastic block copolymers are compounded in such a way as to result in elastomer compositions of matter.

Where in the present specification and claims reference is made to thermoplastic compositions as contrasted to elastomeric compositions, it will be understood that this is measured in terms of an arbitrarily selected ratio, the ratio being the percent of elongation at break divided by the percent of set at break both measured at 23° C. Thermoplastic compositions are considered to be those wherein such a ratio has a value of less than 10 while elastomeric compositions are considered to be those in which the ratio is greater than 10.

Now, in accordance with the present invention, novel compositions achieving the above and other objects are provided wherein the compositions comprise 100 parts by weight of a hydrogenated block copolymer having the general configuration A–B–A wherein, prior to hydrogenation, each A is an alkenyl aromatic hydrocarbon polymer block having an average molecular weight of about 4,000–115,000; B is a conjugated diene hydrocarbon polymer block having an average molecular weight of about 20,000–450,000; the blocks A constituting 2–95% by weight of the copolymer; the unsaturation of the block copolymer having been reduced by hydrogenation to a value within the range of 0–30% of the original unsaturation. This block copolymer is extended by means of a hydrocarbon rubber extender oil in an amount of 5–100 parts by weight based on 100 parts by weight of hydrogenated block copolymer. Still in accordance with the present invention, a three component composition is provided wherein the above composition is modified by the presence of 25–400 parts by weight per 100 parts of the above block copolymers of a second type of block copolymer having the configuration C–D–C wherein each C is a polymer block of a single olefin and D is an elastomeric copolymer block of at least 2 olefins. It will be understood in the description in which follows hereinafter that these olefinic species may be derived by indirect means (such as by hydrogenation of a diolefin block polymer) rather than by direct block copolymerization of the specified monoolefins.

Again in accordance with the present invention, it has been found that elastomeric compositions are provided when the center block B of the originally described block copolymers has an average molecular weight within a defined proportional range relative to the amount of extender oil which is present. Thus by this means it has been possible to utilize a far wider range of plastic end block content and achieve elastomeric compositions even when starting with hydrogenated block copolymers in which the thermoplastic terminal polymer blocks are present in such a proportion that the unmodified polymers are thermoplastic rather than elastomeric. The invention in this respect may be defined as follows: the composition comprises 5–100 parts by weight of a polymeric extending oil and 100 parts by weight of a hydrogenated block copolymer having the above-described configuration but wherein the block B is a polymer block of a conjugated diene. the average molecular weight of the block being a number between about 100Y and 5,000Y, wherein Y is equal to the sum of the parts by weight of the block copolymer and of oil.

Preferably these block copolymers (prior to hydrogenation) are those in which the elastomeric polymer block is formed from a conjugated diene hydrocarbon having from 4–10 carbon atoms per molecule. Still more preferably, the block copolymers are those in which the end blocks (prior to hydrogenation) comprise polymer blocks of a monovinyl aromatic hydrocarbon connected by a block of a $C_{4-10}$ conjugated diene, the end blocks having preferred molecular weight ranges between about 8,000 and about 60,000 while the center block of the conjugated diene has an average molecular weight of between about 50,000 and about 300,000. The preferred class of copolymers is furthermore characterized by being hydrogenated to an extent sufficient to reduce the residual unsaturation to less than about 20. By "residual unsaturation" is meant the original unsaturation of the polymer compared with the unsaturation of the polymer after a hydrogenation treatment, the degree of unsaturation being determined by the usual analytical technique. Furthermore, in the preferred category of block copolymers, exhibiting superior stability and processing characteristics, the weight proportion of nonelastomeric end groups is between about 5% and about 30% wt. based on the total block copolymer.

Suitable species of such block copolymers include the following: polystyrene-polyisoprene - polystyrene, poly (alpha - methylstyrene) - polyisoprene - poly(alpha-methylstyrene), polystyrene - polybutadiene-polystyrene.

In furtherance of the generic concept of the present invention as referred to hereinabove, the presence of a rubber extending oil has enabled the utilization of block copolymers having the general configuration just referred to but wherein the proportion of thermoplastic terminal blocks is increased to as much as about 95% by weight of the total block polymer. The presence of the oil for some undetermined reason works in conjunction with such block copolymers to convert them from their normally thermoplastic character into compositions having elastomeric properties.

The subject hydrogenated block copolymers may be prepared by several different methods including, for example, polymerizing an alkenyl aromatic hydrocarbon in the presence of a lithium-based catalyst to provide a block A of essentially all of said hydrocarbon, thereafter adding monomers of a conjugated diene to the living block polymer A (terminated with a lithium radical), block copolymerizing essentially all of said diene with the first block A to form an intermediate block polymer A–B, subsequently adding monomeric alkenyl aromatic hydrocarbons and block polymerizing the same with the intermediate, whereby a block copolymer is formed, said polymer having the general configuration A–B–A wherein the individual blocks have the molecular weight limitations expressed hereinabove, and thereafter hydrogenating the polymer so obtained so as to result in a hydrogenated block copolymer having less than 30% residual unsaturation.

The process may comprise an alternative route, wherein the block copolymer is prepared by using a dilithium initiator such as a dilithium aromatic hydrocarbon, initially polymerizing the conjugated diene to form the center block terminated on each end with a lithium radical and thereafter block polymerizing on each end the alkenyl aromatic hydrocarbon to form the above-described block copolymer A–B–A and then hydrogenating the same.

The block polymers of this invention in conjunction with mineral oil, have been found to have superior stress-strain properties in addition to outstanding thermal and oxidative stability which, together with their self-vulcanizing characteristics provides elastomeric compositions suitable for a wide variety of molding and other processing operations which the usual elastomeric polymers cannot be subjected to.

The critical difference between the terminal blocks which are nonelastomeric and the center block which is elastomeric may be expressed in the terms of the definition of an elastomer contained in ASTM Special Technical Bulletin No. 184: "A substance that can be stretched at room temperature to at least twice its original length and, after having been stretched and the stress removed, returns with force to approximately its original length in a short time."

The block copolymers are further characterized insofar as their degree of unsaturation is concerned. The hydrogenation of the block copolymers reduces this theoretical unsaturation to less than about 30% of its original value and preferably to an extent of less than about 20% thereof. The reduction of degree of unsaturation is measured by means of iodine number with respect to diene unsaturation, while aromatic unsaturation is measured by ultraviolet or infrared analyses.

The elastomeric blocks preferably comprise those prepared by polymerization of one or more conjugated dienes having from 4 to 10 carbon atoms per molecule and preferably from 4 to 6 carbon atoms per molecule. These comprise particularly butadiene and isoprene as well as alkylated isomers and analogs thereof, including methyl isoprene as well as copolymers of conjugated diolefins with alkenyl aromatic hydrocarbons of which the preferred species comprises styrene-butadiene copolymers. Thus, it will be seen that the physical characteristics of the block copolymer may be varied over a wide range dependent upon the identity of the elastomeric midsection and the average molecular weight thereof as well as upon the spread of molecular weights from minimum to maximum throughout the stated operable range. By "operable" in the present instance is meant those compositions which provide a maximum number of desired properties so as to provide the most effective elastomeric block copolymers for the contemplated end uses.

The non-elastomeric end polymer blocks may comprise homopolymers or copolymers but preferably are prepared from alkenyl aromatic hydrocarbons and still more preferably from vinyl aromatic hydrocarbons wherein the aromatic may be either monocyclic or polycyclic (followed by hydrogenation of the block copolymer). Typical species include styrene, methyl styrene, vinyl xylene, ethylene vinyl xylene, isopropyl styrene, vinyl naphthalene and the like. From one or more of these monomeric alkenyl aromatic hydrocarbons, the end blocks are readily prepared by polymerization with a lithium based catalyst. The end block may be the same or different as long as they meet the generic description of these end blocks given hereinbefore.

The preferred class of catalysts most useful for the preparation of the subject block copolymers may be generically described as "lithium based initiators." These include lithium metal, alkyl lithium compounds and aromatic lithium compounds containing one or more lithium radicals. The two most preferred classes of materials for the preparation of the subject block copolymers include the alkyl lithiums wherein the alkyl radical has from 1 to 10 carbon atoms and the dilithium aromatics thus, the preferred species include butyl lithium, secondary butyl lithium, isobutyl lithium, isoamyl lithium, dilithium naphthalene, dilithium stilbene and the like.

Polymerization is normally conducted at temperatures in the order of −20 to about 100° C., preferably at temperatures between about 20 and 65° C. The proportion of initiators should be maintained as low as possible but may be varied over a relatively wide range from about 1 to about 200 p.p.m. based on the weight of the monomers present, the proportion of catalyst being controlled first by the amount of pure monomer and secondly by the amount of catalyst which will be consumed by acetylenic or other undesirable impurities with which the monomers may be contaminated. The theoretical amount of catalyst required is one lithium radical for each polymer molecule.

Hydrogenation may be conducted under the usual conditions known to experts in this art, utilizing a wide variety of hydrogenation catalysts such as nickel on kieslghur, Raney nickel, copper chromate, molybdenum sulfide, finely divided platinum, finely divided palladium, platinum oxide, copper chromium oxide and the like, although nickel-kieslghur is preferred particularly if it has been activated at a temperature between 500 to 800° F. for a period of several hours by-passing hydrogen thereover. Hydrogenation pressures are preferably in the range from atmospheric to about 3000 p.s.i.g., the usual range being within 100 to 1000 p.s.i.g. The temperature can range from 75° F. to the degradation of the polymer although maximum temperatures are preferably restricted to between 300 and 600° F. Reaction times in the range of 1–24 hours and preferably 2–8 hours can be employed. In the amount of catalyst required is a function of the temperature of hydrogenation and the degree of hydrogenation desired.

The extender oils employed together with the hydrogenated block copolymers of the present invention not only have the primary advantage of substantially reducing the cost of the compositions but also impart interesting properties thereto not possessed by the polymers themselves. This is especially striking in those block copolymers having more than about 50% by weight of thermoplastic terminal blocks. Such block copolymers, unmodified by mineral oils, are in effect thermoplastics and are lacking in the combination of properties regarded as typical of elastomers. However, the introduction of oil into the compositions changes their properties so that the compositions of oil with polymers then exhibit elastomeric properties, especially as defined by the ratio given hereinbefore, namely, wherein the percent of elongation divided by the percent of set at break is in excess of ten.

The oils may be present in amounts ranging from about 5 parts (or even less) to as much as about 100 parts by weight per 100 parts by weight of the hydrogenated block copolymers. While any mineral oil may be used in extending these copolymers the relatively naphthenic or paraphinic oils are preferred for this purpose. Table I which follows gives properties of typical extender oils especially suitable for use in the compositions in this invention.

It will be noted from the properties of the oils in Table I that they are relatively high boiling materials containing only a minor proportion of aromatic hydrocarbons, preferably less than about 30% and more particularly less than about 20% by weight, although with certain of the hydrogenated block copolymers having high polyvinylcyclohexane terminal blocks higher aromaticity of the extender oils may be tolerated.

their stress-strain properties, the following data being obtained:

TABLE II

| | Hydrogenated | Not Hydrogenated |
|---|---|---|
| Polymer, phr | 100 | 100 |
| Dixie clay, phr | 80 | 80 |
| Whiting, phr | 50 | 50 |
| Silica, phr | | |
| TiO$_2$, phr | 20 | 20 |
| Oil, phr | 10 | 10 |
| Petrolatum, phr | 16 | 16 |
| Dye, phr | 10 | 10 |
| Stearic acid, phr | 1 | 1 |
| Blue disp, phr | 1 | |
| Red, phr | | 1 |
| Phenolic stabilizer, phr | 0.5 | |
| Phenolic stabilizer, phr | | 1 |
| Molded 10 minutes at 160° C., properties measured at 23° C.: | | |
| Tensile strength at break, p.s.i | 1,555 | 540 |
| 300 per modulus, p.s.i | 590 | 460 |
| Percent elongation at break | 775 | 600 |
| Percent set at break | 69 | 36 |
| Shore A hardness | 73 | 59 |

The above data indicate clearly that the non-hydrogenated samples in combination with oil were substantially less effective and had a poor set of physical properties than the properties of the composition containing the hydrogenated block copolymer. The oil used for this purpose Oil H described in Table I.

EXAMPLE II

Using the same oil, compositions were prepared by milling the oil with a series of block copolymers all, of which (prior to hydrogenation) had the general configuration polystyrene-polyisoprene-polystyrene.

These block copolymers were substantially completely hydrogenated and had the block molecular weights shown in Table III. Varying amounts of oil were mixed with

TABLE I.—PROPERTIES OF EXTENDER OILS

| Oil | A | B | C | D | E | F | G | H | I | J | K | L |
|---|---|---|---|---|---|---|---|---|---|---|---|---|
| Specific gravity, 50° F | 0.8644 | 0.8827 | 0.9018 | 0.9082 | 0.9352 | 0.9082 | 0.9159 | 0.8783 | 0.8990 | 0.9153 | 0.9309 | 0.9230 |
| Color, ASTM | 0.5 | L1 | L2.0 | L1.5 | 6 | L2.0 | L1.5 | L1.0 | 1.5 | L2.0 | L2.0 | 5.0 |
| Flash point, COC, ° F | 380 | 330 | 330 | 335 | 345 | 385 | 375 | 430 | 410 | 420 | 430 | 480 |
| Fire point, ° F | 430 | 370 | 370 | 375 | 390 | 400 | 435 | 500 | 470 | 470 | 500 | 550 |
| Pour point, ° F | 10 | −50 | −50 | −30 | −35 | −35 | −20 | −10 | −30 | −20 | 0 | 5 |
| Viscosity, SSU 100° F | 103 | 98.2 | 107 | 101 | 164 | 215 | 205 | 256 | 430 | 559 | 840 | 2109 |
| Viscosity, SSU 210° F | 39.5 | 34.8 | 38.3 | 38.1 | 40.7 | 44.3 | 44.0 | 49.3 | 54.7 | 56.3 | 66.4 | 98 |
| Neut. No., mg. NOH/gm | 0.025 | 0.01 | 0.03 | 0.01 | 0.025 | 0.025 | 0.01 | 0.01 | 0.025 | 0.025 | 0.01 | 0.025 |
| Refractive index, 20° C | 1.4740 | 1.4799 | 1.4930 | 1.5030 | 1.5195 | 1.4963 | 1.5080 | 1.4815 | 1.4890 | 1.5005 | 1.5160 | 1.5057 |
| Aniline point, ° F | 210 | 196 | 170 | 157 | 136 | 179.5 | 165 | 222 | 211 | 187 | 183 | 199 |
| Volatile loss, 22 hrs., 225° F., percent w | 0.9 | 6.24 | 7.0 | 6.4 | 3.35 | 5.1 | 2.3 | 0.2 | 0.2 | 0.8 | 0.3 | 0.1 |
| Viscosity, gravity constant | 0.818 | 0.84 | 0.860 | 0.872 | 0.896 | 0.858 | 0.871 | 0.820 | 0.837 | 0.856 | 0.872 | .0852 |
| UV Absorptivity, K$_{260}$ | 0.5 | 0.24 | 2.1 | 8.7 | 17.3 | 5.5 | 10.2 | 1.3 | 0.7 | 4.3 | 13.5 | 6.3 |
| Distillation, ° F.: | | | | | | | | | | | | |
| IBP | 642 | 616 | 600 | 566 | 628 | 600 | 610 | 719 | 710 | 718 | 635 | 780 |
| 5% | 674 | 628 | 635 | 625 | 642 | 651 | 645 | 754 | 745 | 750 | 726 | 819 |
| 10% | 682 | 636 | 645 | 631 | 656 | 670 | 680 | 762 | 757 | 760 | 766 | 838 |
| 50% | 704 | 672 | 700 | 693 | 686 | 760 | 745 | 820 | 810 | 813 | 850 | 913 |
| 90% | 744 | 728 | 769 | 788 | 736 | 840 | 815 | 879 | 865 | 868 | 925 | 980 |
| Mol. type anal., clay-gel. percent w.: | | | | | | | | | | | | |
| Resins | 0.2 | 0.2 | 0.7 | 2.0 | 4.5 | 1.5 | 2.2 | 0.2 | 0.7 | 1.8 | 4.1 | 5.0 |
| Aromatics | 12.1 | 8.6 | 29.0 | 42.8 | 47.4 | 30.7 | 45.0 | 20.2 | 14.0 | 34.8 | 46.4 | 36.4 |
| Saturates | 87.7 | 91.2 | 70.3 | 55.2 | 48.1 | 67.8 | 52.8 | 79.6 | 85.3 | 63.4 | 49.5 | 58.5 |
| Carbon atom analysis, percent: | | | | | | | | | | | | |
| Aromatics | 2 | 1 | 10 | 19 | 26 | 10 | 20 | 4 | 2 | 7.3 | 21 | 11 |
| Naphthenes | 36 | 49 | 43 | 34 | 36 | 43 | 31 | 34 | 46 | 42.6 | 29 | 37 |
| Paraffins | 62 | 50 | 47 | 47 | 38 | 47 | 49 | 62 | 52 | 50.1 | 50 | 52 |

The following examples illustrate the compositions of this invention.

EXAMPLE I

Tests were carried out of a composition suitable for weather-stripping purposes and the like. One sample contained non-hydrogenated block copolymer and another of the same polymer after hydrogenation. The block polymer (before hydrogenation) was polystyrene-polyisoprene-polystyrene having average block molecular weights of 15,000-75,000-15,000. After molding for 10 minutes at 160° C. the samples of the compositions were tested for these block copolymers and the stress-strain properties thereof compared with the unmodified polymers. It will be seen from the data contained in Table III that the addition of oil to these essentially thermoplastic polymers resulted in compositions having elastomeric properties as measured by the criterion given hereinbefore, namely, the ratio of elongation at break to set at break being greater than 10.

The properties were tested by preparation of the usual tensile specimens and pulling them at a rate of 20 inches per minute at 23° C.

TABLE III

| Sample | | | | | | |
|---|---|---|---|---|---|---|
| Block molecular weights ×10⁻³ | 15-39-15 | | 42-70-41 | | 22-23-21 | |
| Wt. percent terminal blocks | 44 | | 54 | | 67 | |
| Parts oil per 100 parts by wt. of polymer | 0 | 50 | 0 | 75 | 0 | 100 |
| Properties at 23° C.: | | | | | | |
| Tensile at break, p.s.i | 5,525 | 1,775 | 4,700 | 1,175 | — | 225 |
| 300% modulus, p.s.i | 1,500 | 450 | 1,675 | 250 | — | 150 |
| 500% modulus, p.s.i | 3,700 | 775 | 2,000 | 375 | — | 150 |
| Elongation at break, percent | 560 | 690 | 510 | 930 | — | 570 |
| Set at break, percent | 135 | 45 | 200 | 75 | — | 35 |

(—) Broke at very low elongation under test conditions.

We claim as our invention:
1. A thermoplastic elastomeric composition comprising
   (a) 5–100 parts by weight of a mineral oil;
   (b) 100 parts by weight of a hydrogenated block copolymer having 0–30% of the original unsaturation and having the general configuration

A–B–A wherein, prior to hydrogenation,
   (1) each A is of a polymerized alkenyl aromatic hydrocarbon block having an average molecular weight between about 4,000 and 115,000;
   (2) B is a polymer block of a conjugated diene, the average molecular weight of the block being a number between 100Y and 5,000Y, wherein Y is an equal to the sum of the parts by weight of components (a) and (b);
   (3) the weight of the blocks A being 50–95% of the block copolymer.

2. A composition according to claim 1 wherein the mineral oil contains no more than about 30% by weight of aromatics.

3. A composition according to claim 1 wherein Y=200–4,500.

4. A thermoplastic elastomeric composition comprising
   (a) 5–100 parts by weight of a mineral oil;
   (b) 100 parts by weight of a hydrogenated block copolymer having 0–30% of the original unsaturation and having the general configuration

A–B–A wherein, prior to hydrogenation,
   (1) each A is a polymerized alkenyl aromatic hydrocarbon block having an average molecular weight between about 4,000 and 115,000;
   (2) B is a polymer block of a conjugated diene, the average molecular weight of the block being 20,000–450,000;
   (3) the weight of the blocks A being 50–95% of the block copolymer.

References Cited

UNITED STATES PATENTS

| 3,265,765 | 8/1966 | Holden et al. | 260—879 |
| 3,333,024 | 7/1967 | Haefele et al. | 260—880 |

ALLAN LIEBERMAN, Primary Examiner

U.S. Cl. X.R.

260—879, 880